US012560930B2

(12) United States Patent
Gaston et al.

(10) Patent No.: US 12,560,930 B2
(45) Date of Patent: Feb. 24, 2026

(54) IDENTIFYING TRANSPORT STRUCTURES

(71) Applicant: Mobile Industrial Robots Inc., Holbrook, NY (US)

(72) Inventors: Peter C. Gaston, Gloucester, MA (US); Syed Mohammed Jerrar Bukhari, Boston, MA (US)

(73) Assignee: Mobile Industrial Robots Inc., Holbrook, NY (US)

( * ) Notice: Subject to any disclaimer, the term of this patent is extended or adjusted under 35 U.S.C. 154(b) by 46 days.

(21) Appl. No.: 17/837,854

(22) Filed: Jun. 10, 2022

(65) Prior Publication Data

US 2023/0400858 A1     Dec. 14, 2023

(51) Int. Cl.
  *G05D 1/00*         (2024.01)
(52) U.S. Cl.
  CPC ......... *G05D 1/0214* (2013.01); *G05D 1/0088* (2013.01); *G05D 1/0276* (2013.01)
(58) Field of Classification Search
  CPC .. G05D 1/0214; G05D 1/0088; G05D 1/0276; G05D 1/2462; G05D 1/242;
  (Continued)

(56) References Cited

U.S. PATENT DOCUMENTS 6,952,488 B2 * 10/2005 Kelly ........................ G06T 7/75
                                                    701/28
9,715,232 B1    7/2017 Fischer et al.
(Continued)

FOREIGN PATENT DOCUMENTS

| | | | | |
|---|---|---|---|---|
| EP | 2769361 B1 * | 9/2008 | .............. | B66F 9/122 |
| EP | 3961259 A1 | 3/2022 | | |
| JP | 2012-137304 A | 7/2012 | | |

OTHER PUBLICATIONS

Mohamed, I. S., Alessio, C., Fulvio, M., Stefano, R., & Renato, Z. (Online Pub: Aug. 6, 2019; Jul. 2020). Detection, localisation and tracking of pallets using machine learning techniques and 2D range data. Neural Computing & Applications, 32(13), 8811-8828. doi: https://doi.org/10.1007/s00521-019-04352-0 (Year: 2019).*

(Continued)

*Primary Examiner* — Helal A Algahaim
*Assistant Examiner* — Leah N Miller
(74) *Attorney, Agent, or Firm* — ArentFox Schiff LLP

(57) ABSTRACT

An example method is performed by one or more processing devices and includes the following: identifying one or more features based on data obtained from a two-dimensional scan of a space, where the data includes predefined characteristics; identifying physical attributes of the one or more features; performing calculations based on the physical attributes for the one or more features, where the calculations produce one or more possible configurations for one or more candidate transport structures in the space; comparing the one or more possible configurations to one or more predefined configurations for one or more known transport structures; identifying which, if any, of the one or more candidate transport structures is most likely to be a known transport structure based on the comparing; and controlling an autonomous vehicle based on the identifying.

34 Claims, 11 Drawing Sheets

(58) Field of Classification Search

CPC ........... G05D 2105/28; G05D 2107/70; G05D 2109/10; G05D 2111/17; G01S 17/89; G01S 13/881; G01S 15/931; G01S 17/931; G01S 2013/9323; G01S 2013/9324

USPC .......................................................... 701/24

See application file for complete search history.

(56) References Cited

U.S. PATENT DOCUMENTS

| | | | |
|---|---|---|---|
| 9,864,911 B1 | 1/2018 | Curlander et al. | |
| 10,007,266 B2 | 6/2018 | Fischer et al. | |
| 10,114,372 B1 | 10/2018 | Theobald | |
| 10,242,273 B1 | 3/2019 | Eckman | |
| 11,228,751 B1* | 1/2022 | Russell | B65D 19/38 |
| 2010/0310182 A1 | 12/2010 | Kroepfl et al. | |
| 2011/0218670 A1* | 9/2011 | Bell | B66F 9/0755 |
| | | | 700/214 |
| 2014/0277691 A1* | 9/2014 | Jacobus | B66F 9/24 |
| | | | 700/216 |
| 2015/0347840 A1* | 12/2015 | Iida | G06T 7/73 |
| | | | 382/103 |
| 2016/0090284 A1 | 3/2016 | Svensson et al. | |
| 2016/0332554 A1 | 11/2016 | Ambrosio et al. | |
| 2017/0113352 A1 | 4/2017 | Lutz et al. | |
| 2017/0302905 A1* | 10/2017 | Shteinfeld | G06T 7/62 |
| 2018/0089517 A1 | 3/2018 | Douglas et al. | |
| 2018/0165269 A1* | 6/2018 | Liu | G06F 40/232 |
| 2018/0281178 A1 | 10/2018 | Jacobsen | |
| 2018/0374036 A1 | 12/2018 | Nazarian et al. | |
| 2019/0194005 A1* | 6/2019 | Shah | G06T 7/73 |
| 2019/0370567 A1 | 12/2019 | Eckman | |
| 2019/0384314 A1 | 12/2019 | Jacobsen | |
| 2020/0004247 A1 | 1/2020 | Jacobsen et al. | |
| 2020/0010214 A1 | 1/2020 | Newcomb | |
| 2020/0031642 A1 | 1/2020 | Uchimura et al. | |
| 2020/0055671 A1 | 2/2020 | Toebes et al. | |
| 2020/0103882 A1 | 4/2020 | Sullivan et al. | |
| 2020/0180647 A1 | 6/2020 | Anthony | |
| 2021/0035056 A1* | 2/2021 | Jacobus | G05D 1/246 |
| 2021/0114826 A1 | 4/2021 | Simon et al. | |
| 2021/0182996 A1 | 6/2021 | Cella et al. | |
| 2021/0272037 A1 | 9/2021 | Hanebeck | |
| 2021/0349468 A1* | 11/2021 | Bukhari | G06V 20/64 |
| 2021/0349488 A1 | 11/2021 | Bukhari et al. | |
| 2022/0036302 A1 | 2/2022 | Cella et al. | |
| 2022/0121837 A1* | 4/2022 | Cesic | G05D 1/69 |

OTHER PUBLICATIONS

International Search Report for PCT Application No. PCT/US2021/030206, issued Aug. 20, 2021, (4 pages).

Written Opinion for PCT Application No. PCTiUS2021I030206, issued Aug. 20, 2021, (4 pages).

MIR 100 User Guide. Mobile Industrial Robots A/S. Odense, SO. (Aug. 2018). V. 1.1, (pp. 1-42), 44 pages.

MIR 100 User Guide. Mobile Industrial Robots A/S. Odense, SO. (Nov. 2017). V. 1.0, (pp. 1-37), 39 pages.

MIR 500 User Guide. Mobile Industrial Robots A/S. Odense, SO. (Sep. 2019). V. 1.3, (pp. 1-100), 100 pages.

MIR Fleet Reference Guide. Mobile Industrial Robots A/S. Odense, SO. (Jan. 2017). V. 1.0, (pp. 1-30), 32 pages.

Navitrol Pallet Detection. Navitec Systems. Espoo, Finland. (May 2018). V. 1.2, (pp. 1-8), 8 pages.

Varga, Robert. (Robert). "Vision-based Autonomous Load Handling for Automated Guided Vehicles", 2014 IEEE 10th International Conference on Intelligent Computer Communication and Processing (ICCP), Cluj Napoca, Romania, Sep. 4-6, 2014. Technical University of Cluj Napoca, IEEE, (6 pages).

Waheed, Imran. (Dec. 2006). "Trajectory I Temporal Planning of a Wheeled Mobile Robot" (Corpus ID No. 61900664) [Degree of Master of Science in the Department of Mechanical Engineering, University of Saskatchewan, Canada]. Semantic Scholar.erg. (111 pages).

U.S. Appl. No. 62/738,697, filed Sep. 28, 2018, (73 pages).

U.S. Appl. No. 62/738,800, filed Sep. 28, 2018, (62 pages).

Molter et al., "Real-time Pallet Localization with 3D Camera Technology for Forklifts in Logistic Environments," mediaTUM, [online] Retrieved from URL: https://ieeexplore.ieee.org/stamp/stamp.jsp?tp=&arnumber=8476740, (Dec. 2018), 6 pages.

International Search Report and Written Opinion in Application No. PCT/US2023/024428, dated Aug. 21, 2023, 27 pages.

Extended European Search Report received for European Patent Application No. 23820317.8, mailed on Jul. 3, 2025, 13 pages.

* cited by examiner

_30_

A

RECEIVE INSTRUCTION —30a

CONTROL ROBOT TO MOVE BASED ON INSTRUCTION AND MAP —30b

DIRECT LIDAR SCANNER —30c

PERFORM 2D SCAN —30d

PRODUCE FEATURE MAP —30e

40

RECEIVE CANDIDATE
CONFIGURATION — 40a

COMPARE CANDIDATE
CONFIGURATION — 40b

ASSIGN CONFIDENCE
SCORE TO CANDIDATE
BASED ON
COMPARISON — 40c

STORE CONFIDENCE
SCORE IN MEMORY — 40d

PREDEFINED
CONFIGURATION(S)
REMAINING? — 40e
YES    NO

CANDIDATE
CONFIGURATION(S)
REMAINING? — 40f
YES    NO

CONFIDENCE SCORES
OBTAINED FOR EACH
CANDIDATE
CONFIGURATION — 40g

IDENTIFYING TRANSPORT STRUCTURES

TECHNICAL FIELD

This specification relates generally to examples of an autonomous vehicle configured to identify transport structure in an environment.

BACKGROUND

Forklifts or other drivable machinery may be used to lift transport structures in a space, such as a warehouse or manufacturing facility, and to move those transport structures from one location to another location. Examples of transport structures include pallets and containers. An example pallet includes a flat surface, or "deck", that supports goods during lifting and one or more pockets that can be engaged to lift and to hold the pallet. An example container includes a transportable structure having one or more vertical walls and structure that can be engaged to pick-up the container.

SUMMARY

An example method is performed by one or more processing devices and includes the following: identifying one or more features based on data obtained from a two-dimensional (2D) scan of a space, where the data includes or represents predefined characteristics; identifying physical attributes of the one or more features; performing calculations based on the physical attributes for the one or more features, where the calculations produce one or more possible configurations for one or more candidate transport structures in the space; comparing the one or more possible configurations to one or more predefined configurations for one or more known transport structures; identifying which, if any, of the one or more candidate transport structures is most likely to be a known transport structure based on the comparing; and controlling an autonomous vehicle based on the identifying. The method may include one or more of the following elements, either alone or in combination.

The one or more features may include multiple features. Performing the calculations may include performing calculations for different combinations of the multiple features based on the physical attributes for the multiple features, The calculations may produce multiple possible configurations for multiple candidate transport structures in the space. Comparing the one or more possible configurations to one or more predefined configurations may include comparing the multiple possible configurations for the multiple candidate transport structures to the one or more predefined configuration for the known transport structures.

The calculations may include determining lengths for the different combinations of the features by obtaining a difference between front left and front right locations of the different combinations of features. Identifying which, if any, of the one or more candidate transport structures is most likely to be the known transport structure may include assigning a confidence score to each of the candidate transport structures. The confidence score may be based, at least in part, on how much alike a geometry of a candidate transport structure is to a geometry of the known transport structure as determined by the comparing. The confidence scores of the one or more candidate transport structures may be compared to a threshold. If one of the confidence scores exceeds the threshold, then a candidate transport structure having the one of the confidence scores may be deemed most likely to be the known transport structure. If more than one of the confidence scores exceeds the threshold, then an error may be indicated. The confidence score of a candidate transport structure may be based on an X-axis location of the candidate transport structure, a Y-axis location of the candidate transport structure, an angular position of the candidate transport structure, and/or a width of the candidate transport structure. The angular position of the candidate transport structure may be based on a centroid of the candidate transport structure.

The one or more features identified based on data obtained from a two-dimensional scan of the space may include points in a cluster of points. The points in the cluster may have at least a predefined proximity to each other, at least a predefined continuity, and/or at least a predefined count. The physical attributes of the one or more features may include extremities associated with the one or more features. The extremities may include a front left and a front right of each feature. The calculations may include: determining a length between the front left and the front right of each feature; determining centroids for each of the lengths; and obtaining a normal for each of the centroids. The one or more possible configurations may include one or more of locations of pillars and pockets in the one or more candidate transport structures. The one or more possible configurations may include a pose of the one or more candidate transport structures.

The example method may include identifying an empty location based on a 2D scan. The space may be next to the empty location. The one or more possible configurations may be for part of one or more candidate transport structures. The one or more predefined configurations may be for all or part of a known transport structure. The autonomous vehicle may be controlled to deposit a transport structure in the empty space based on a likelihood of a candidate transport structure being the known transport structure and a location of the candidate transport structure based on the physical attributes for the one or more features obtained from the 2D scan.

The space may be part of an area for holding a transport structure. Identifying which, if any, of the one or more candidate transport structures is most likely to be the known transport structure may include: assigning a confidence score to a candidate transport structure, where the confidence score is based, at least in part, on how much alike a geometry of the candidate transport structure is to a geometry of the known transport structure; and comparing the confidence score of the candidate transport structure to a threshold. If the confidence score is greater than or equal to the threshold, the candidate transport structure may be recognized as the known transport structure. If the confidence score is less than the threshold, the method may include re-scanning the space and, for the re-scanning, the operations may include: repeating identifying the one or more features, identifying the physical attributes, performing the calculations, comparing, and identifying which if any, of one or more candidate transport structures is most likely to be the known transport structure.

The one or more candidate transport structures may be or include one or more candidate pallets and the known transport structure may include a known pallet. The one or more candidate transport structures may be or include one or more candidate containers and the known transport structure may include a known containers.

In another example, one or more non-transitory machine-readable storage media may store instructions that are executable by one or more processing devices to perform operations to implement the example method either alone or in combination with one or more of the preceding elements.

In another example, a system includes an autonomous vehicle having a scanner to perform a two-dimensional (2D) scan of a space and a control system that includes non-transitory machine-readable memory storing instructions that are executable and one or more processing devices to execute the instructions to perform operations that include: identifying one or more features based on data obtained from the two-dimensional scan of the space, where the data includes or represents predefined characteristics; identifying physical attributes of the one or more features; performing calculations based on the physical attributes for the one or more features, where the calculations produce one or more possible configurations for one or more candidate transport structures in the space; comparing the one or more possible configurations to one or more predefined configurations for one or more known transport structures; identifying which, if any, of the one or more candidate transport structures is most likely to be a known transport structure based on the comparing; and controlling the autonomous vehicle based on the identifying. The example system may include one or more of the following elements, either alone or in combination.

The control system may be part of the autonomous vehicle. All or part of the control system may be physically remote from the autonomous vehicle. The one or more candidate transport structures may be or include one or more candidate pallets and the known transport structure may be or include a known pallet. The transport structure may be part of a stack of multiple transport structures and may hold one or more additional transport structures. The instructions executed by the one or more processing devices may also implement any elements associated with the above-described example method, either alone or in combination.

Any two or more of the elements described in this specification, including in this summary section, can be combined to form implementations not specifically described herein.

The systems and techniques described herein, or portions thereof, may be implemented, at least in part, by a computer program product that includes instructions that are stored on one or more non-transitory machine-readable storage media and that are executable on one or more processing devices (e.g., microprocessor(s), application-specified integrated circuit(s), programmed logic such as field programmable gate array(s), or the like). The systems and techniques described herein, or portions thereof, may be implemented as one or more apparatus or a method and may include one or more processing devices and computer memory to store executable instructions to implement control of the various functions. The systems and techniques, including but not limited to apparatus, methods, and/or components, described herein may be configured, for example, through design, construction, arrangement, placement, programming, operation, activation, deactivation, and/or control.

The details of one or more implementations are set forth in the accompanying drawings and the description below. Other elements, objects, and advantages will be apparent from the description and drawings, and from the claims.

DESCRIPTION OF THE DRAWINGS

Like reference numerals in different figures indicate like elements.

DETAILED DESCRIPTION

Described herein are examples of techniques for identifying transport structures in an environment using an autonomous vehicle, and to example systems for implementing those techniques. The techniques include identifying features based on a two-dimensional (2D) scan of the environment, identifying physical attributes of those features, identifying candidate configurations of transport structures, and comparing those candidate configurations to predefined configurations for known transport structures. The candidate configuration having a confidence score that exceeds a threshold for a known transport structure is identified as the known transport structure.

The transport structures used as examples herein include pallets and containers; however, any appropriate types of transport structures may be used including, but not limited to, boxes, racks, crates, or bins. The techniques described herein are described using a pallet; however, they may be used with any appropriate transport structure.

Figure 1:
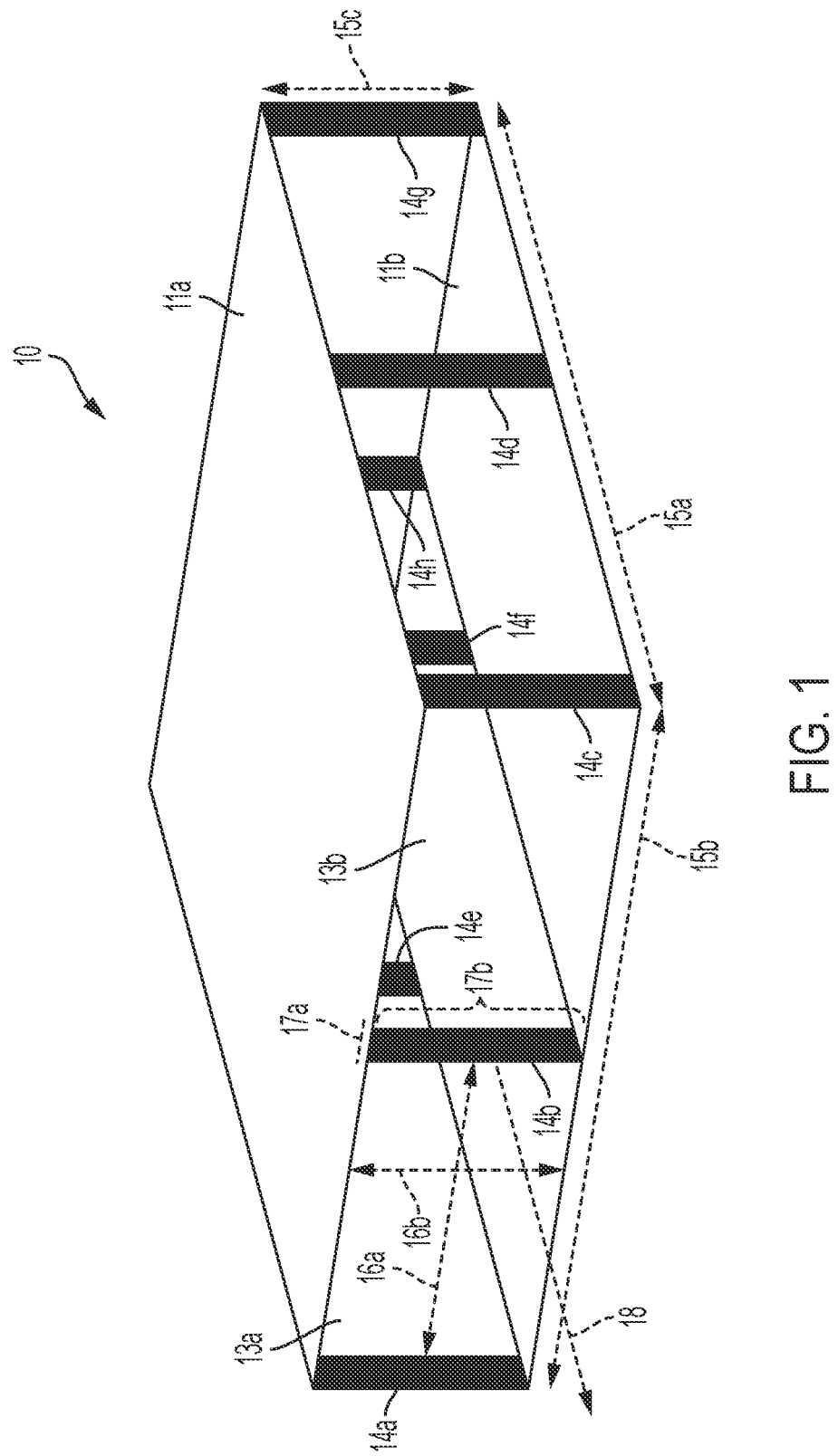
FIG. 1 is a perspective view of an example pallet.

Referring to FIG. 1 example pallet 10 includes a top flat deck 11*a* for supporting goods (e.g., during transport), a bottom flat deck 11*b*, pockets 13*a* and 13*b* that a device can engage to lift and to hold the pallet, where a pocket comprises an empty space between pillars, and multiple pillars 14*a* to 14*h* that provide structural support for the pallet. Different types of pallets may have different configurations than that shown in FIG. 1. For example, some pallets may have one pocket or more than two pockets; some pallets may have different numbers of pillars; some pallets may have side walls; different pallets may have different dimensions such as different lengths 15*a*, widths 15*b*, and/or heights 15*c*; different pallets may have different pocket dimensions, such as different pocket widths 16*a* and/or heights 16*b*; different pallets may have different pillar dimensions such as different pillar widths 17*a* and/or heights 17*b*. Some pallets may include pockets on their sides in addition to, or instead of, pockets on their fronts. Some pallets may be covered in whole or in part—for example, shrink-wrapped—using opaque plastic or the like. The shrink-wrap may cover features of the pallet, making them undetectable to a scanner. In cases of shrink-wrapped pallets, all or some pockets and/or pillars may not be visible.

Figure 2:
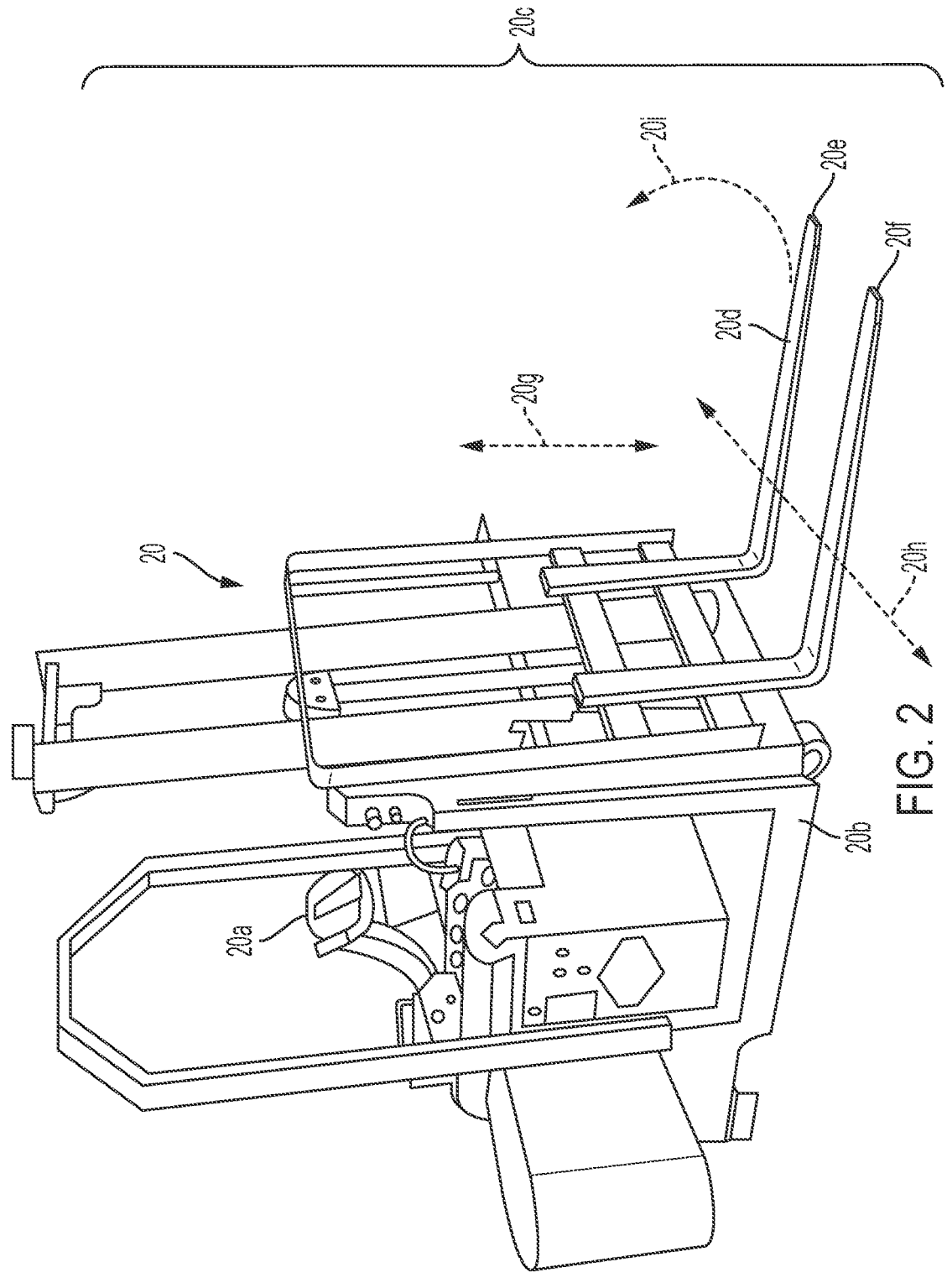
FIGS. 2 and 3 are perspective views of an example autonomous vehicle.
Figure 3:
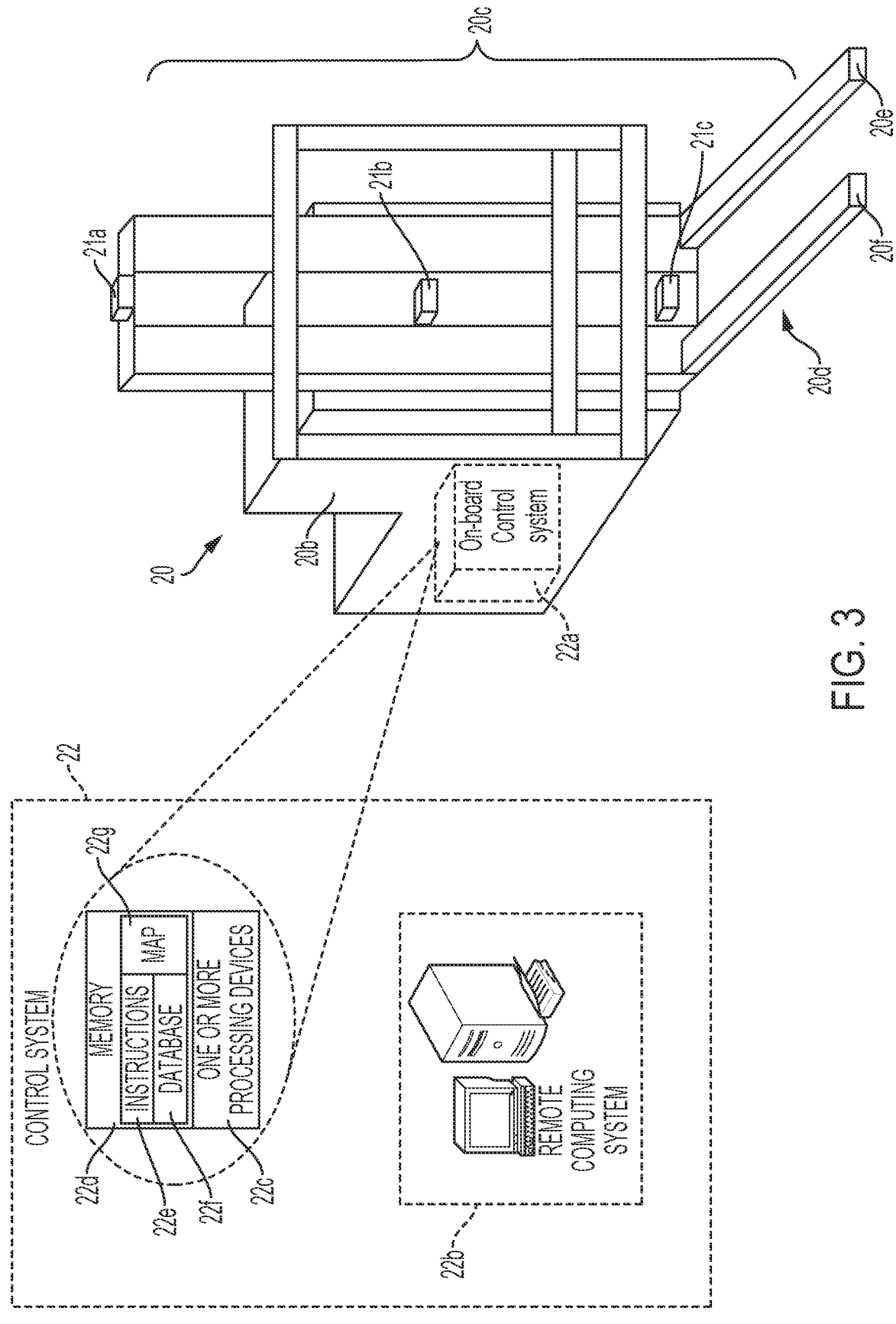

An example autonomous vehicle, such as a mobile robot, includes a body configured for movement along a surface. FIGS. 2 and 3 show an example of a robot 20 that may be used to implement the techniques described herein. Robot 20 is an autonomous forklift; however, other types of robots may be used in the techniques described herein, such as robot 60 of FIG. 11, which is described below. In this example, robot 20 is autonomously-controllable even though it includes mechanisms 20*a* for manual control. In an example, autonomously-controllable includes the robot moving of its own accord based on sensor inputs and, in some cases, inputs from a remote system such as a fleet control system. Robot 20 includes a body 20*b* having wheels (not shown) to enable robot 20 to travel across a surface, such as the floor of a warehouse, a factory, or other indoor or outdoor terrain. Robot 20 also includes a support area 20*c* configured to support the weight of a pallet or other type of transport structure, using an end-effector 20*d*. In this example, robot 20 may be controlled to transport the pallet from one location to another location.

As shown in FIG. 2, end-effector 20*d* includes a fork comprised of two tines 20*e*, 20*f* in this example. Other types of end-effectors may be used, such as a plate or a gripper. The tines may be configured for vertical movement in the directions of arrows 20*g*. The vertical movement enables the tines to pick-up a transport structure and to move the transport structure to a vertical height. The tines also may be configured for horizontal movement in the directions of arrow 20*h*. In some examples, the tines are interconnected and, therefore, move together. In some examples, each tine may be configured for independent and separate horizontal movement along the directions of arrow 20*h*. That is, each tine may move relative to the other tine to adjust the distance between the two (or pitch). This adjustment may be necessary to accommodate pallets having different pocket locations. In some examples, each tine may be configured for independent and separate vertical movement along the directions of arrow 20*h*. In some examples, one of the tines may be movable out of the way to allow a single tine to interact with a pallet. For example, tine 20*e* may be rotatable by 90° in the direction of arc 20*i*, leaving tine 20*f* in position to interact with a pallet located in front of robot 20. The other tine 20*f* may operate similarly.

The end-effector, the robot body, or a combination of the end-effector and the robot body may move in three, four, five, or six degrees of freedom in order to engage a pallet, to lift the pallet, to move the pallet, and to place the pallet at a location.

As shown in FIG. 3, one or more sensors 21*a*, 21 *b*, and 21*c* are located on robot 20 for use in detecting the location of the robot itself, for detecting a pallet to pick-up, and/or for detecting a location in which to place a pallet. In implementations that include multiple sensors on the front of the robot, the sensors may be located at different positions, for example at different locations, examples of which are shown. Examples of sensors include 2D and three-dimensional (3D) sensors. For example, robot 20 may include one or more 3D cameras, one or more 2D light detection and ranging (LIDAR) scanners 21*b*, one or more optical sensors, one or more sonar sensors, one or more time-of-flight (TOF) sensors, one or more radar sensors, one or more 2D camera sensors, one or more ultrasonic sensors, or any appropriate multiple numbers and/or combination thereof. Notably, the example robots described herein are not limited to these types of sensors. The techniques described herein use data obtained by scanning a 2D field-of-view using a LIDAR scanner 21*b*, as described below. However, the data used may be obtained by another appropriate type of 2D sensor.

Robot 20 may include, or be associated with, a control system 22. Control system 22 may include circuitry and/or an on-board computing system to control operations of the robot. The circuitry or on-board computing system is "on-board" 22*a* in the sense that it is located on the robot itself. The control system may include, for example, one or more microcontrollers, one or more microprocessors, programmable logic such as a field-programmable gate array (FPGA), one or more application-specific integrated circuits (ASICs), solid state circuitry, or any appropriate combination of two or more of these types of processing devices 22*c*. Memory 22*d* stores instructions 22*e* that are executable by the one or more processing devices to perform and/or to control all or part of the processes described herein. In some implementations, on-board components of the control system may communicate with a remote computing system 22*b* wirelessly. This computing system 22*b* is remote in the sense that it is not located on the robot itself. For example, the control system can also include computing resources distributed to a remote—for example, a centralized or cloud—service at least a portion of which is not on-board the robot. Commands provide by the remote computing system may be transferred for execution by the on-board computing system. In some implementations, the control system includes only on-board components. In some implementations, the control system includes a combination of on-board components and the remote computing system. In some implementations, the control system may be configured—for example programmed—to implement control functions and robot movement absent either local or remote input from a user In some implementations, the remote computing system 22*b* may be or include a fleet control system. The fleet control system may include one or more computing devices that operate together to control, to influence, or to instruct multiple robots of the type described herein. For example, the fleet control system may be configured to coordinate operations of multiple robots, including instructing movement of a robot to a position where a pallet is located and to a position where the pallet is to be stacked (for example, placed). For example, the fleet control system may be configured to coordinate operations of multiple robots, including instructing movement of a robot to a position where a pallet is to be picked-up. In some implementations, the fleet control system may store in memory, maintain, and/or update a map of the space in which the robot or robots are to operate. The map may be accessed by each robot through the fleet control system or the map may be downloaded periodically, intermittently, or sporadically to all or some robots operating in the space. For example, the robot may use the map to position itself proximate to a pallet in order to identify the pallet. In this example, positioning may include moving the robot directly in front of a pallet and/or so that the robot's end-effector aligns to pockets in the pallet that is to be picked-up, which may include moving the body, the end-effector, or both. In some examples, positioning the robot to identify the pallet may include moving the robot in front of a pallet such that a side of the robot faces the pallet, that is, its end-effector is perpendicular to a pallet's centroid. Later, following identification of the pallet using the techniques described herein, the robot may pivot into position so that its end-effector aligns to the pockets.

In some implementations, the control system, including the remote portions thereof, may be distributed among multiple robots operating in the space. For example, one of the robots may receive the map—for example, from a fleet controller—and distribute the map to robots operating locally within the space. Similarly, one or more robots within the space may send command and control signals to other robots.

The control system 22, whether on-board the robot, remote from the robot, or a combination of on-board and remote, may include, in memory 22*e*, a database 22*f* comprising a library of data representing predefined configurations of different types of pallets. For example, the database may include attributes identifying the make of an pallet; the model of an pallet; the number of pillars in a pallet; the number of pockets in a pallet; the dimensions of a pallet such as length, width, and height; the dimensions of each pocket in a pallet such as width and height; the dimensions of each pillar in a pallet including such as width and height; the locations of each pillar in a pallet; and/or any other information that may be usable to define and to distinguish a pallet's configuration. This information may be usable by the robot to identify a pallet and to control the robot body and/or its end-effector to pick-up and to move the pallet. For example, an on-board control system on the robot may obtain information from a local or remote database of this type and may use that information to recognize the pallet based on its configuration and to pick-up and/or to move the pallet.

The robot's sensors 21a to 21c constitute a vision system for the robot. Visual data obtained by the vision system may be used to determine a location of the robot within a space and a location of objects within the space. In this regard, in some implementations, control system memory 22d stores a map 22g of the space to be traversed by the robot. The map may be located on the robot or at any location that is accessible to the control system. The map may include locations of landmarks, such as columns, corners, windows, poles, and other distinguishable features of the space that act as references for the robot. The map may include dimensions and distinguishing characteristics, such as color, shape, texture, and so forth of landmarks, such as columns, walls, corners, windows, poles, and other distinguishable features of the space that act as references for the robot. The map may also include measurements indicating the size of the space, measurements indicating the size and locations of the landmarks, measurements indicating distances between landmarks, and coordinate information identifying where the landmarks are located in the space.

The control system 22 uses information in the map to control the robot move the robot throughout the space and uses visual data from the vision system and data from the map to determine a location of the robot within the space. The map also includes the known and/or expected locations of pallets in the space and the known and/or expected locations and/or dimensions of empty areas in the space within the space where pallets can be placed or that are adjacent to known and/or expected pallet locations. The known and/or expected locations of pallets in the space include the pose of the pallet. The pose may include the orientation of the pallet within the space. Referring to FIG. 1, for example, the orientation may be defined as the direction that a normal vector 18 from a front center of the pallet points. The direction of the normal vector may be defined, for example, with respect to a landmark or location on the map.

Referring to FIGS. 4, 5, 6, and 7, the following operations may be used to identify/recognize a pallet. The operations may be performed using the robot and the robot's control system or one or more computing systems that are separate from, and in communication with, the robot's control system.

Figure 4:
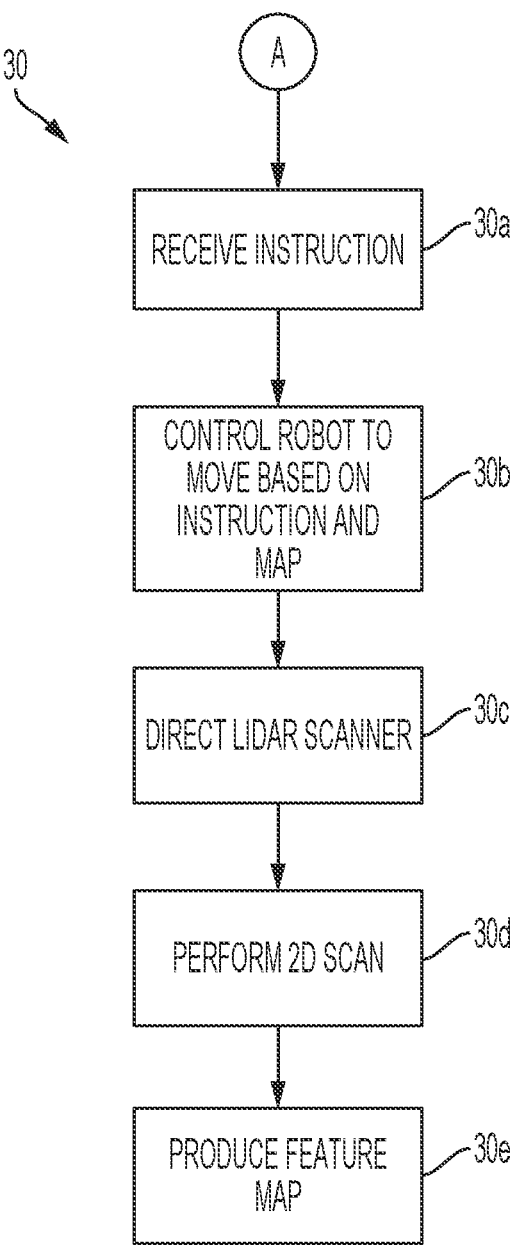
FIG. 4 to 7 are flowcharts showing operations included in example processes for identifying a transport structure, such as a pallet, in an environment.
Figure 8:
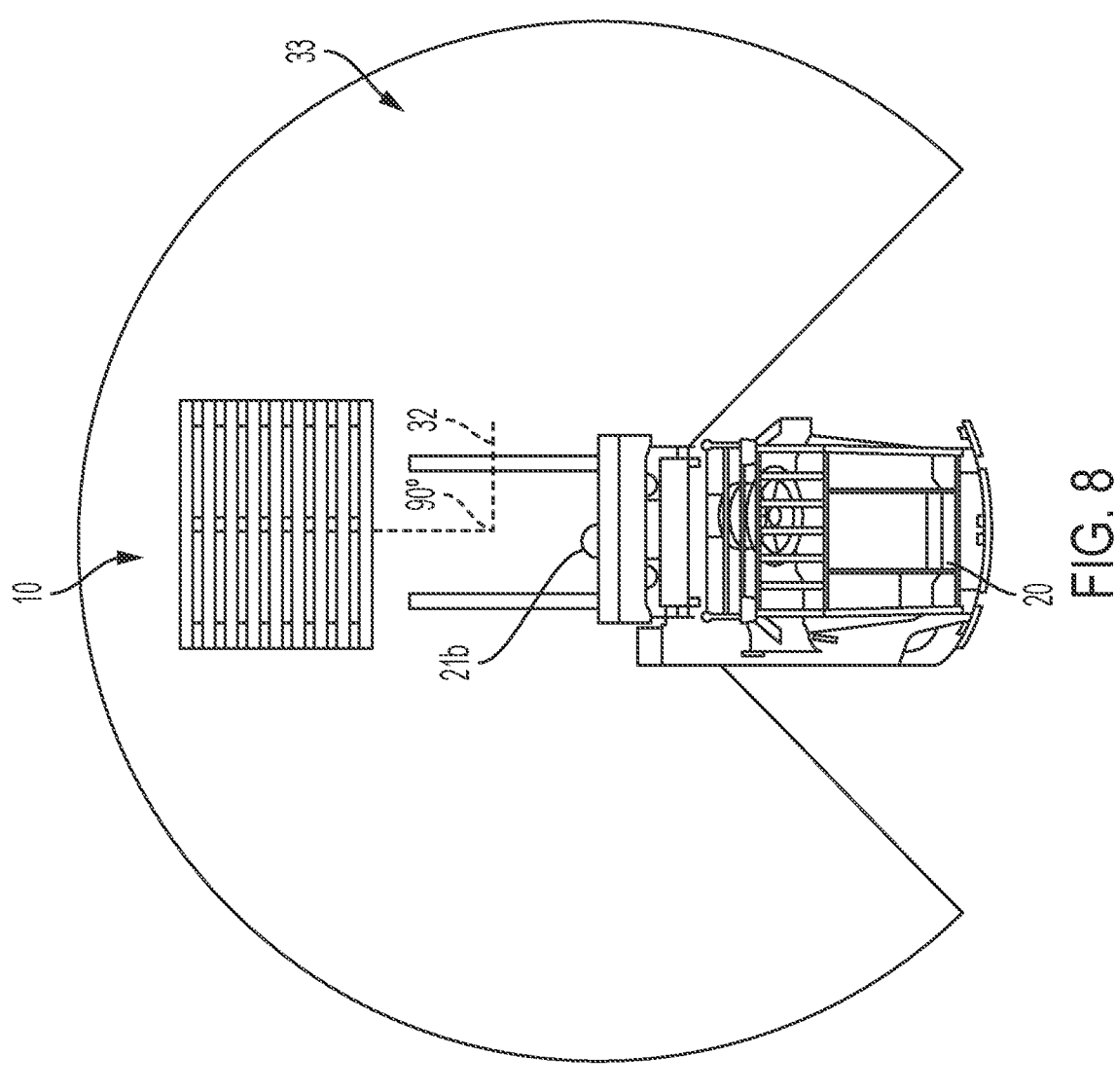
FIG. 8 is a top view of an example autonomous vehicle scanning a pallet.

Referring to FIG. 4, control system 22 executes process 30 to receive (30a) instructions from an operator or computer program to move to the vicinity of a pallet of interest in a space, such as a warehouse, containing the robot and the pallet. The control system may control (30b) the robot to move to a location proximate to the pallet based on the instruction and to direct (30c) the robot's LIDAR scanner toward an expected location of the pallet. The movement through the space and directing the robot's LIDAR scanner may be accomplished using the map 22g of the space described previously. In some implementations, robot 20 is positioned in front of pallet 10 such that LIDAR scanner 21b faces the pallet at as close to a 90° angle 32 as possible, as shown in FIG. 8. In some cases, however, the pose of pallet, or its angular position, may prevent the scanner from facing the pallet at an exact 90° angle. In some implementations, to approach a pallet for pick-up, a robot may back down an aisle adjacent to the pallet until the pallet appears to the side. The pallet may then be scanned from the robot's side using the LIDAR scanner and the pallet recognized using the processes described herein. That is, the sweep of the LIDAR scanner is great enough (e.g., 270° or greater) to scan all or part of a pallet on either side of the robot. In this example, the robot then pivots to the position shown in FIG. 8.

Referring back to FIG. 4, control system 22 controls LIDAR scanner 21b to perform (30d) a 2D scan of an area containing the pallet. For example, as shown in FIG. 8, LIDAR scanner 21b is controlled to scan one or more fields 33 that contains pallet 10. In this example, field 33 is a 270° field; however, other fields may have other sizes. The resulting scanning produces data representing at least part of the pallet. The data may comprise points that are defined by polar coordinates and that correspond to the distance to locations of pallet features, such as pillars, pockets, and decks, and the angle at which those features are located relative to the LIDAR scanner 21b. The data from the LIDAR scanner may be used to produce (30e) a map of those features to scale. To scale in this case may mean that the dimensions provided in the map correspond to the real-world dimensions of the pallet. Referring to FIGS. 1 and 8, for example, performing LIDAR scanning of the pallet 10 may produce the map 34 shown in FIG. 9. In this example, data points 34a represent pillar 14a, data points 34b represent pillar 14b, data points 34c represent pillar 14c, data points 34e represent pillar 14e; and data points 34d represent pillar 14d. Note that, due to the positioning of the scanner and/or the pallet and/or a covering on the pallet, in some cases not all pillars of the pallet can be seen by the LIDAR scanner and, therefore, represented in map 34.

Figure 5:
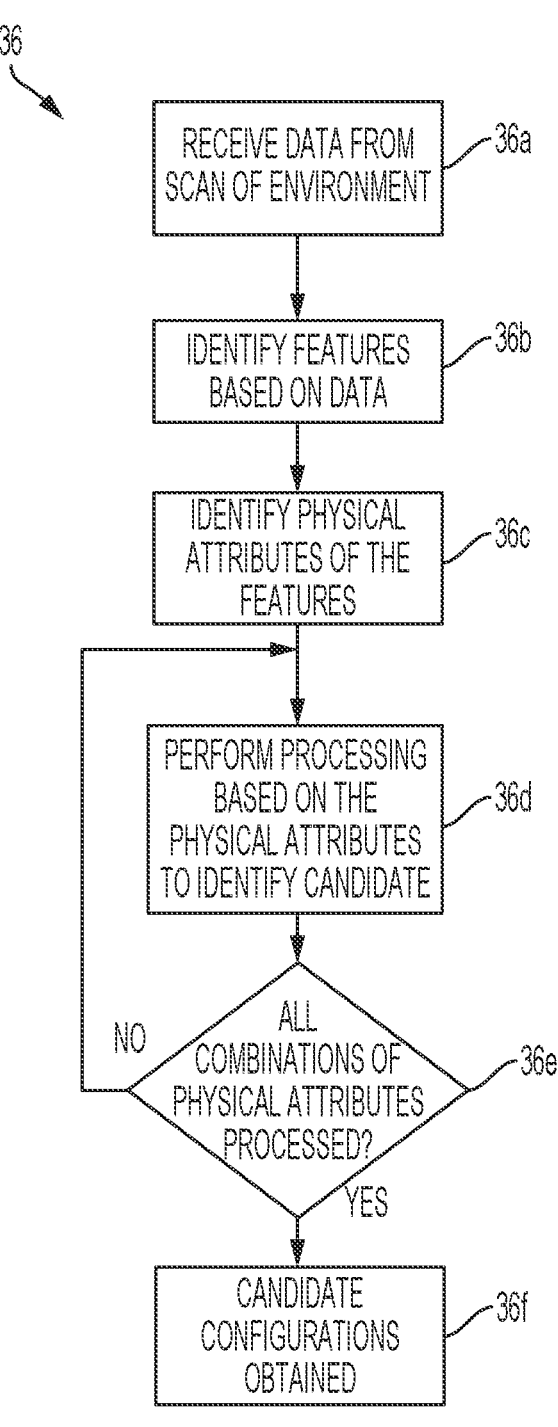
Figure 6:
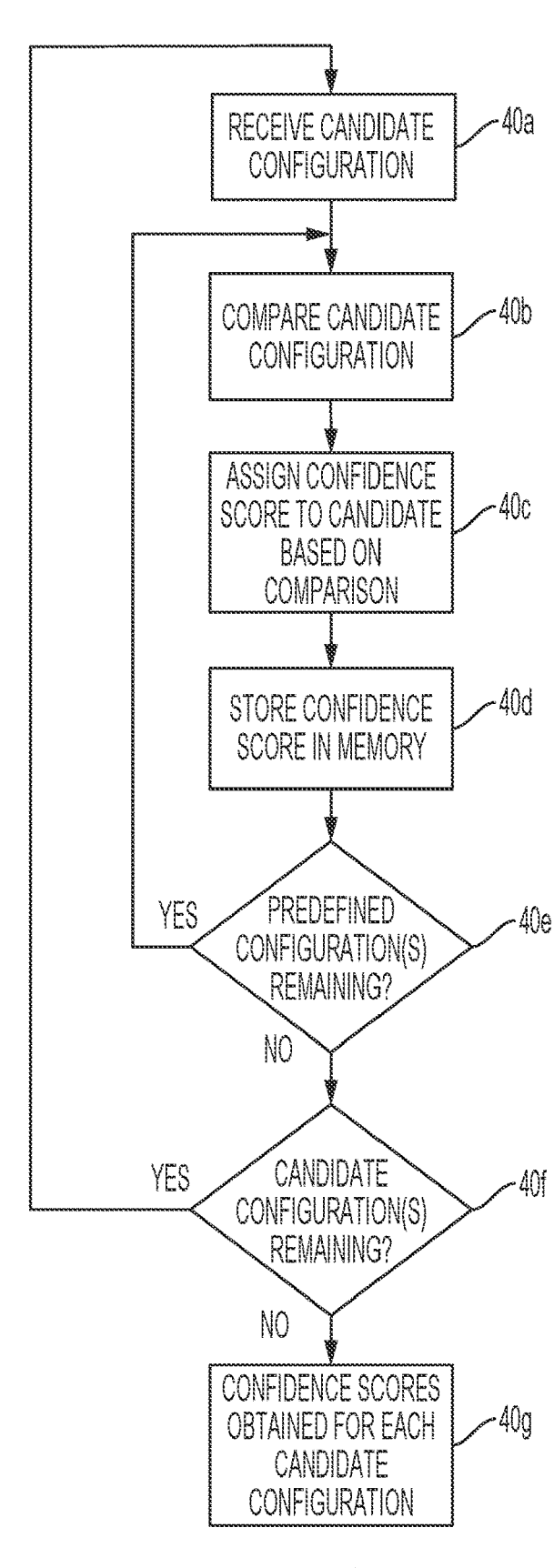
Figure 9:
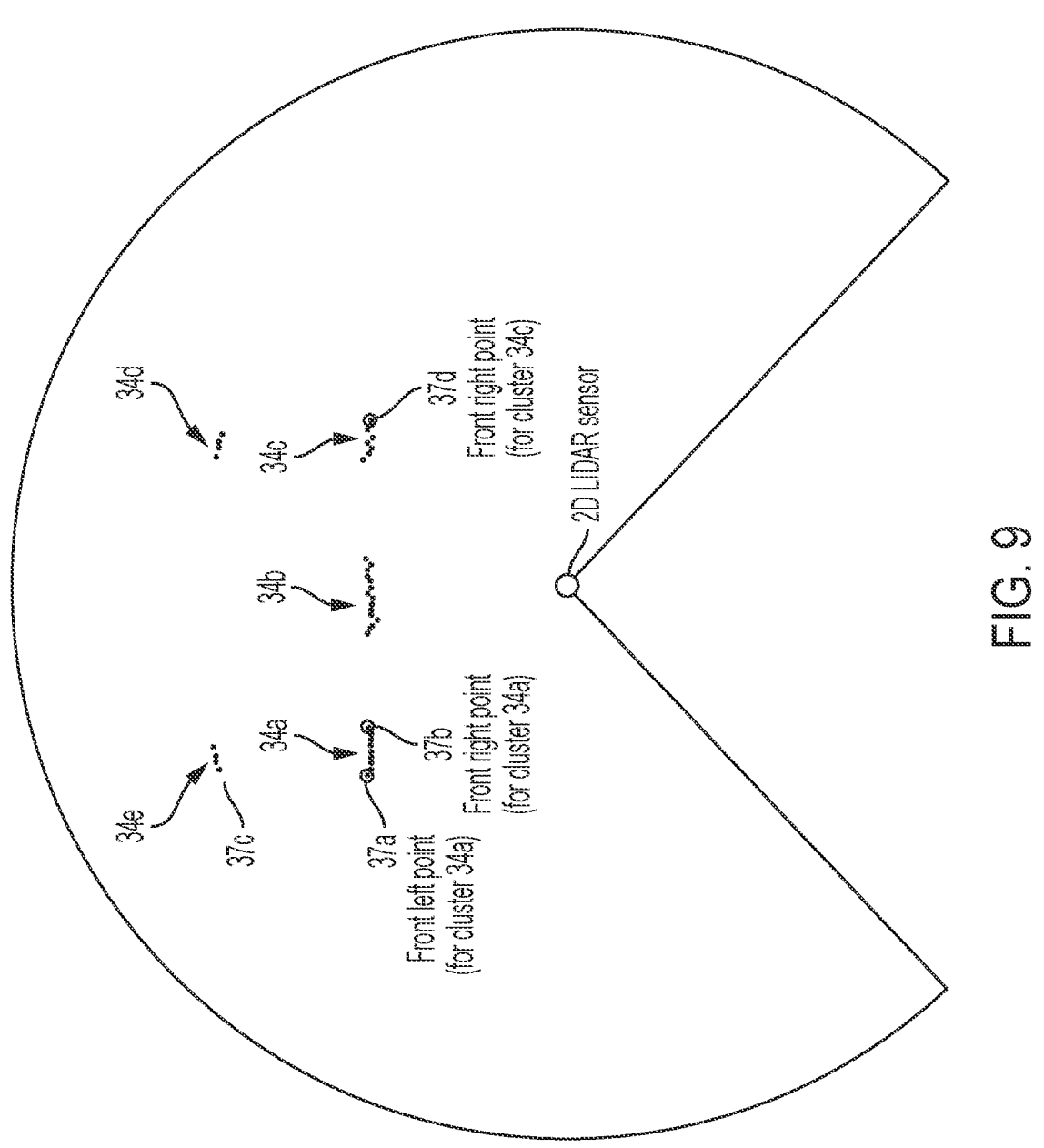
FIG. 9 is an example map of data points obtained by scanning a pallet.

Referring to FIG. 5, process 36 uses the scanned data, such as that shown in map 34, to obtain candidate configurations for the pallet. In this regard, a candidate configuration incudes a potential, but not necessarily actual, configuration of a pallet that is determined based on the scanned data. Process 36 receives (36a) the scanned data for a pallet. Process 36 identifies (36b) features of the pallet based on the scanned data. The features may be, for example, pillars, pockets, or other structures that are part of the pallet. The features may be identified by identifying points in a cluster. Points that are considered by process 36 to be in a cluster may have one or more of the following characteristics: a predefined number or count, a predefined proximity to each other, and/or at least a predefined amount of continuity. The number or count indicates how many points are present. If the number of points in a given area exceeds a predefined threshold, then those points are more likely to be a cluster. The predefined proximity refers to how close adjacent points are to each other. If the distance between two points is less than a predefined threshold, then those points are more likely to be a cluster. The amount of continuity refers to how close adjacent sets of points are to each other. If the distance between two sets of points is less than a predefined threshold, then those two sets points are likely to be part of a same cluster. The thresholds may be set based on experimentation and programmed into the control system. Other factors also may be used to identify a cluster. In the example of FIG. 9 data points 34*a* meet the criteria for a cluster, as do points 34*b* to 34*e*.

Process 36 identifies (36*c*) physical attributes of the identified features. The physical attributes may be extremities of the features that can be used to determine one or more dimensions of a candidate configuration for a pallet that contains those features. For example, for each feature defined by a cluster of points, process 36 may identify the front left and front right corners of the feature. For feature (cluster) 34*a* (FIG. 9), this includes identifying front left corner 37*a* and front right corner 37*b*. The corners may be identified by identifying locations of data points that are at the front left and front right and that do not border other points in two or more dimensions, and then obtaining coordinates of those points from the map. Since the map is to scale, as indicated above, the differences between coordinates in the map correspond to physical dimensions of the feature. In some implementations, physical attributes other than, or in addition to, the front left and front right corners may be identified. For example, in some implementations, the center or middle of each feature may be identified.

In this example, for all combinations of physical attributes identified in the scanned data, process 36 processes (36*d*) the physical attributes to identify a candidate configuration for a pallet containing those features. The processing may include performing one or more calculations using the physical attributes to obtain distances between, or lengths of, features that include the physical attributes. For example, referring to FIG. 9, the calculations may include obtaining the difference between the front left 37*a* of feature 34*a* and the front right of all remaining features 34*b* to 34*e*. For feature 34*e*, the calculations may include obtaining the difference between the front left 37*c* of feature 34*e* and the front right of all remaining features 34*a* to 34*d*. This may be repeated until (36*e*) all combinations of physical attributes have been processed.

The resulting distances or lengths may be combined to produce the candidate configurations. For example, the distance between the front left 37*a* of feature 34*a* and the front right 37*d* of feature 34*c* may be combined into a candidate configuration having an overall length from front top left of feature 34*a* to front right of feature 34*c*, having a first pocket having length from the front right of feature 34*a* to the front left of feature 34*b*, and having a second pocket having a length from the front right of feature 34*b* to the front left of feature 37*d*. In some implementations, all possible combinations of features may be used to generate candidate configurations. In some implementations, the control system may limit the candidate configurations to a predefined number of pockets, a number of pillars, or the like in order to reduce or to limit the total number of candidate configurations for a pallet.

In cases where the pallet is shrink-wrapped (e.g., using opaque material), there may be only one front left and front right measurement that can be used to identify the pallet using the techniques described herein. That is, the LIDAR scanner may only capture data for what appears to be a single large structure because of the shrink-wrap.

Also, for each candidate configuration for a pallet, the calculations may include determining a centroid and obtaining a normal vector to the centroid. The centroid, in an example, is the mid-point between two ends of the pallet and the top and bottom of the pallet. Once the centroid is determined, the normal vector may be determined to be the vector that is at a right angle (90°) to a line that passes through the centroid and that bisects the candidate configuration of the pallet along its front face. For example, FIG. 1 shows a normal vector 18 for 10. As noted, the normal vector represents the pose, or angular position, of a candidate configuration, which is indicative of the direction that the pallet having the candidate configuration is believed to be facing. A normal vector may be associated with each candidate configuration.

At the end of process 36 (FIG. 5), all candidate configurations are obtained (36*f*). The candidate configurations may be stored in memory and retrieved for use in process 40 of FIG. 6. In process 40, each candidate configuration is assigned a confidence score. The confidence score is indicative of how closely a candidate configuration matches a predefined configuration for a pallet, which may be stored in the database described above. For example, the confidence score indicates how much alike a geometry of a candidate pallet configuration is to a geometry of a predefined pallet configuration. Process 40 receives (40*a*) a candidate configuration. Process 40 compares (40*b*) the candidate configuration to one of the predefined configurations from the database. The comparison may include comparing features such as the diagonal lengths of the candidate and predefined configurations, diagonal lengths of pockets in the candidate and predefined configurations, the number of pockets in the candidate and predefined configurations, the number of pillars in the candidate and predefined configurations, and so forth. The more closely these features match in the candidate and predefined configurations, the greater the confidence score will be.

The confidence score may also be affected by the pose of the pallet. In this regard, as noted above, the map also includes the known and/or expected locations of pallets in the space, including their poses. The comparison (40*b*) includes comparing the pose of the candidate configuration to the known pose of the pallet at the location that was scanned. The more closely that the poses of the candidate configuration and the pallet at the location match, the greater the confidence score will be. For example, the pose matching may be used to increase or to decrease the confidence score determined by matching features in the candidate and predefined configurations.

The confidence score is assigned (40*c*) based on the comparison (40*b*); and the confidence score is stored (40*d*) in memory. If there are more predefined configurations from the database remaining (40*e*) to be compared to the candidate configuration, process returns to operation 40*b* and, thereafter, operations 40*b* to 40*e* are performed for a different predefined configurations from the database. If there are no more predefined configurations from the database remaining (40*e*) to be compared to the candidate configuration and there are candidate configurations remaining to be processed (40*f*), process 40 receives (40*a*) a next candidate configuration, and repeats operations 40*a* to 40*f* for the next candidate configuration. Processing continues until no more candidate configurations remain (40*f*) and confidence scores have obtained (40*g*) for each—for example, all—candidate configurations.

Figure 7:
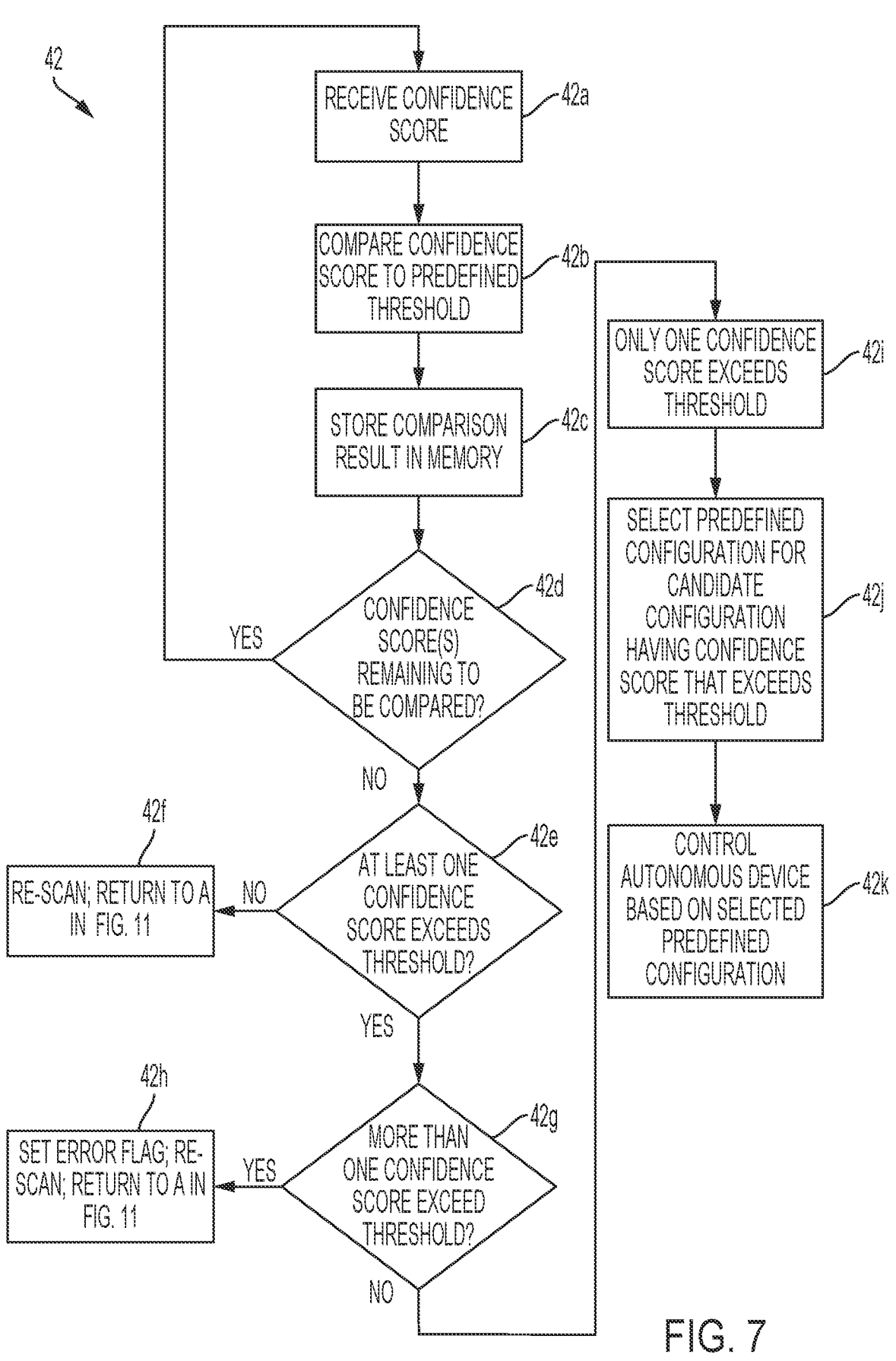

Process 42 of FIG. 7 uses the obtained confidence scores to recognize/determine the identity (e.g., the make, model, type, etc.) of the pallet that was scanned and to control the robot based on that determination. For example, process 42 includes receiving (42*a*) one of the confidence scores for a candidate configuration and comparing (42*b*) the received confidence score to a predefined threshold. The predefined threshold may be determined experimentally and programmed into the control system to identify a candidate configuration that best matches a predefined configuration.

The comparison result may be stored (42c) in memory. Operations 42a to 42d are repeated for each confidence score determined by process 42 until there are no more confidence scores remaining (42d) to be compared.

Process 42 determines (42e) whether at least one confidence score exceeds the threshold. If not (42e), this means that no candidate configuration sufficiently matches a predefined configuration and, therefore, that the pallet cannot be identified or recognized. Accordingly, the robot may be moved and the pallet may be re-scanned (42f). For example, processing may return to FIG. 4, where the robot and/or the LIDAR scanner may be moved to rescan an area containing the pallet. Processing may the proceed in accordance with processes 30, 36, 40, and 42 based on the new scan data.

Referring back to FIG. 7, process 42 determines (42g) whether more than one confidence score exceeds the threshold. In example, the scanner may obtain data for two adjacent pallets. Those pallets may be arranged a distance apart from each other such that, based on the data, features of the two pallets match one of the predefined configurations. In this case, there may be more than one confidence score that exceeds threshold—one for the actual pallet and one for a "phantom" pallet. If that is the case, this means that there may be an error in identifying the pallet and an error flag is set (42h). In this case, the robot may be moved and the pallet may be re-scanned. For example, processing may return to FIG. 4, where the robot and/or the LIDAR scanner may be moved to rescan an area containing the pallet. Processing may the proceed in accordance with processes 30, 36, 40, and 42 based on the new scan data.

In cases where process 42 determines (42i) that there is only one confidence score that exceeds the threshold, the predefined configuration associated with that confidence score is selected (42j) as the configuration of the pallet. That is, the pallet is deemed most likely to have the predefined configuration. The robot may then be controlled (42k) based on the predefined configuration. For example, the control system may move the robot so that its tines engage the pallet's pockets and to pick-up the pallet. The robot may use information from the predefined configuration, such as the pocket locations, and the pose of the pallet to interact with the pallet.

Figure 10:
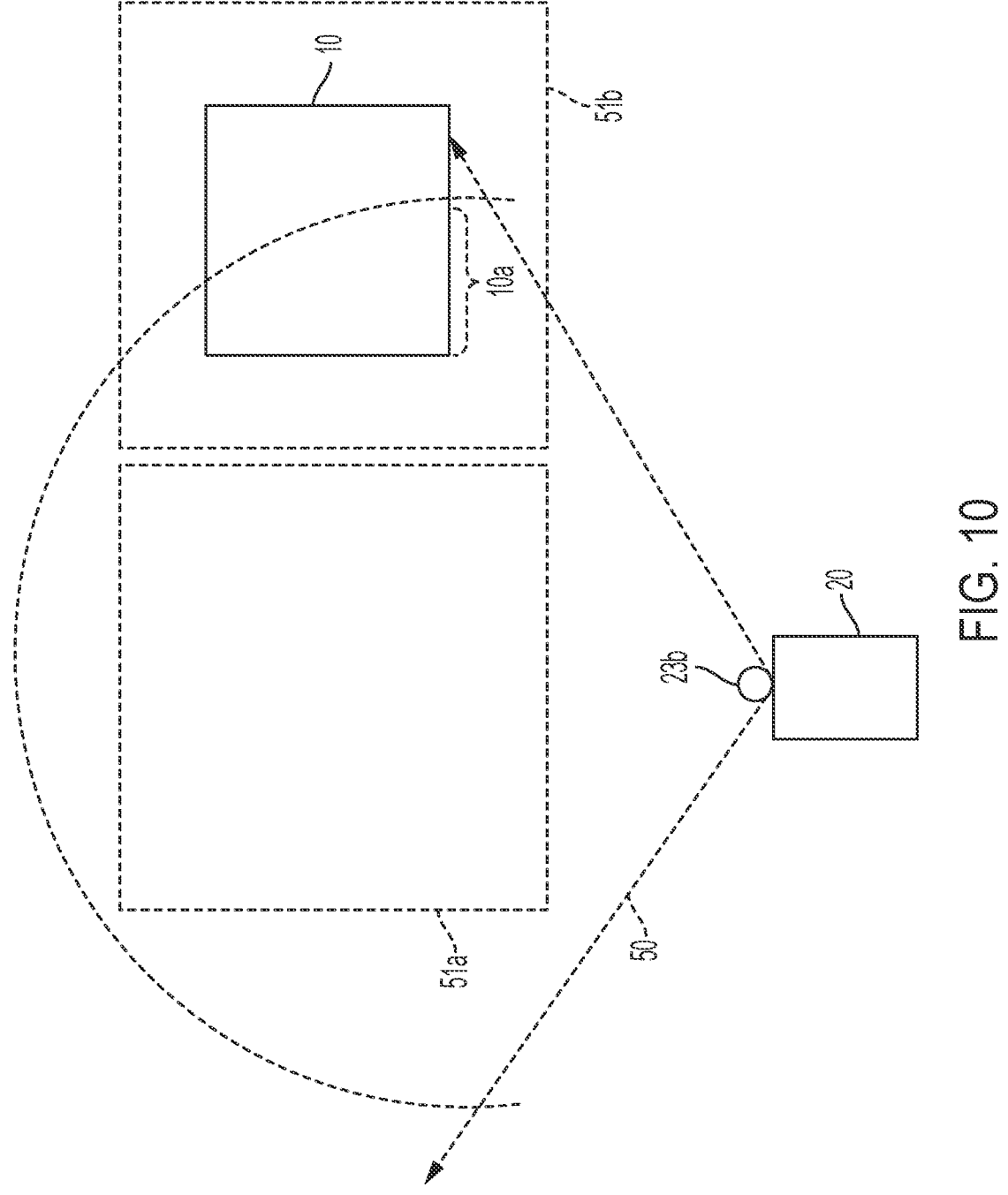
FIG. 10 is a top view of an example autonomous vehicle scanning an empty area and part of a pallet in an adjacent area.

In some implementations, processes 30, 36, 40, and 42 may be used to identify or to recognize a pallet based on scanned data for only part of (e.g., less than the whole of) the pallet. For example, referring FIG. 10, robot 20 may scan 50 area 51a and part of area 51b. Area 51b contains a pallet 10 and area 51a is empty and does not contain a pallet. Rather than repositioning robot 20 in order to scan the entirety of pallet 10, scan data for part 10a of pallet 10 may be used to identify the configuration of pallet 10 using processes 30, 36, 40, and 42. In some implementations, the amount of the pallet that needs to be scanned to identify its configuration is determined based on experimentation and observation. In some implementations, at least three quarters of the front, side(s), and/or back of pallet 10 may be scanned to identify its configuration, at least one half of the front, side(s), and/or back of pallet 10 may be scanned to identify its configuration, or at least one quarter of the front, side(s), and/or back of pallet 10 may be scanned to identify its configuration. Following pallet identification, robot 20 may be controlled, e.g., to place a pallet in area 51a or to move to the front of area 51b to engage pallet 10 with its tines and to lift pallet 10 for movement.

Types of autonomous vehicles other than those shown in FIGS. 2 and 3 may be used to implement the techniques described herein, including processes 30, 36, 40, and 42.

Figure 11:
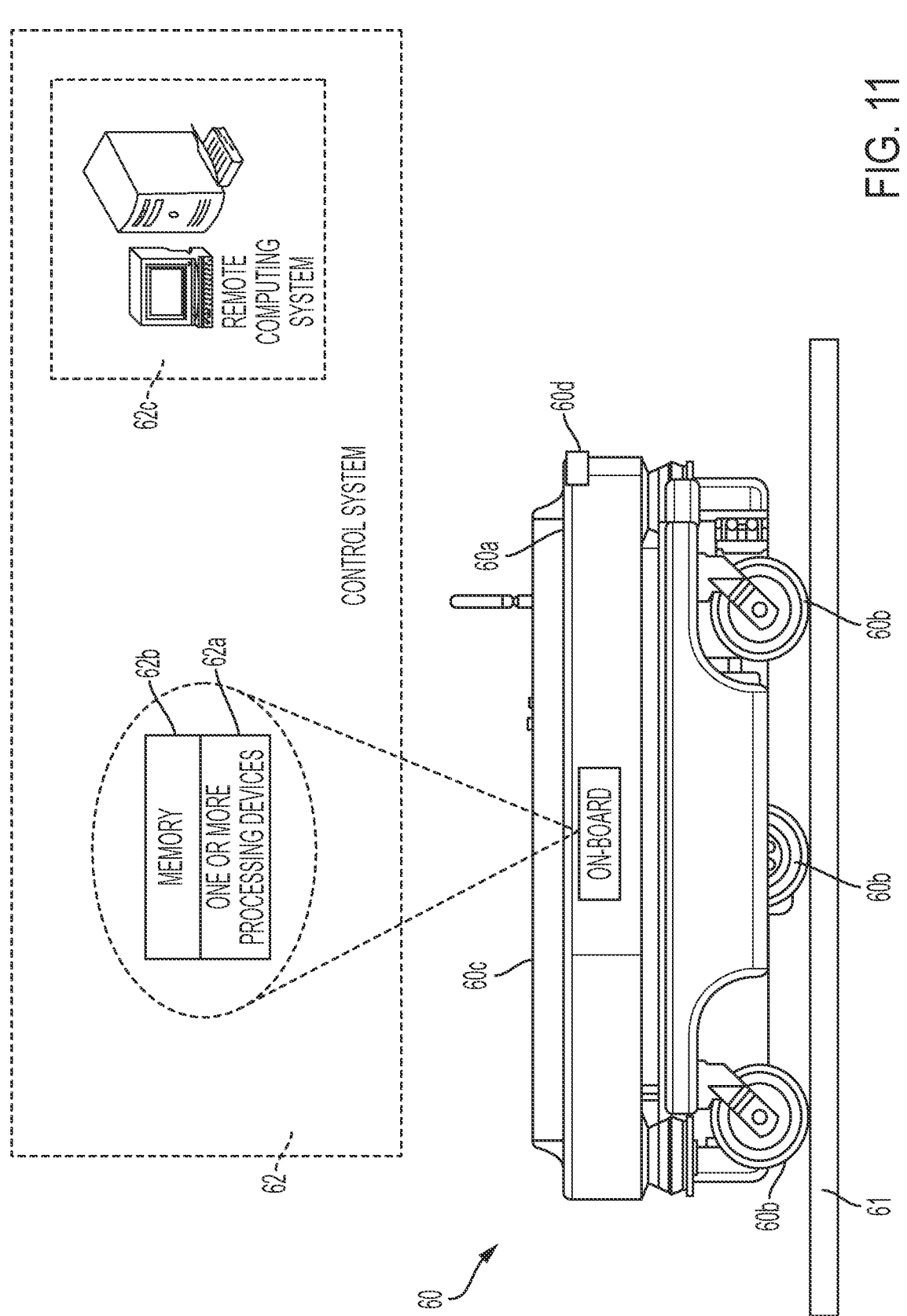
FIG. 11 is a side view of another example autonomous vehicle.

Another example autonomous vehicle (robot) configured to implement the techniques described herein is shown in FIG. 11. Robot 60 includes a body 60a having wheels 60b to enable robot 60 to travel across a surface 61, such as the floor of a warehouse, a factory, or other terrain. Robot 60 includes a support area 60c configured to support the weight of an object, such as a transport structure as described herein. In this example, robot 60 may be controlled to transport the object from one location to another location. Robot 60 includes various detectors—also referred to as sensors—for use in detecting elements in the vicinity of the robot.

In this example, robot 60 includes different types of visual sensors, such as one or more 3D cameras, one or more 2D cameras, and one or more LIDAR scanners 60d. The LIDAR scanners, the 3D cameras, and/or any other sensors on the robot make up a vision system for the robot. The data obtained by a LIDAR scanner in particular may be used as described herein in implementing processes 30, 36, 40, and 42.

As was the case above, the control system 62 for robot 60 may be located on the robot itself, distributed across various locations or devices, or located remotely from the robot at a stationary location. For example, the control system may be implemented using one or more processing devices 62a and memory 62b on the robot that stores instructions that are executable by the one or more processing devices to implement at least part of processes 30, 36, 40, and 42. The control system may be implemented using one or more processing devices on the robot and on one or more other robots (not shown) that are traveling or have traveled in the same space as the robot. The control system may be implemented using one or more processing devices that are part of remote computing system 62c that is separate from all robots in the space. The control system may be implemented using one or more processing devices that are on the robot, on one or more other robots, and/or at the stationary location.

A fleet management system, which may be implemented on remote computing system 62c may be configured to control one or more robots and to perform at least some of the functions described herein. The fleet management system and each of the robots may include a copy of, or have access to, the same map of the space. The fleet management system may be configured to receive updated information about the actual position and operational status of each robot in a fleet of robots. A fleet may include robots of the type shown in FIGS. 2 and 3 and of the type shown in FIG. 11.

In some implementations, the control system may be configured to process commands from an external source, such as enterprise resource planning (ERP) system. In some implementations, the control system, the robots, and the sensors may communicate over a wireless communication system, such as Local Area Network (LAN) having Wi-Fi, ZigBee, or Z-wave. Other networks that may also be used for communication between the control system, the robots, and the sensors may include, but are not limited to, LoRa, NB-IoT (NarrowBand Internet of Things), and LTE (Long Term Evolution). The control system may include an application programmable Interface (API) through which other systems can interact with the control system.

Robot 60 does not have tools, such as tines, to engage a pallet. However, robot 60 may use the techniques described herein to identify the configuration of pallets in the space and to send that information to the fleet management system or to other robots.

Robots 20 and 60 may operate in the same environment using a common control system such as control system 22, control system 62, or a combination thereof.

The example autonomous vehicles described herein may be controlled, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the testing can be performed by one or more programmable processors executing one or more computer programs to perform the functions described herein. All or part of the testing can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Any mechanical or electrical connection herein may include a direct physical connection or an indirect connection that includes intervening components.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A method performed by one or more processing devices, comprising:

receiving, at a control system for an autonomous vehicle, a map of a space that is usable by a fleet of autonomous vehicles to navigate through the space, the map including locations where transport structures are expected to be in the space, the map including poses of the transport structures expected to be at the locations;

(i) identifying features based on data obtained from a two-dimensional scan of at least part of a location where a transport structure is expected to be;

(ii) identifying physical attributes of the features;

(iii) performing calculations based on the physical attributes of the features, where candidate configurations for the transport structure at the location are based on the calculations;

(iv) comparing (i) the candidate configurations to predefined configurations for known transport structures, and (ii) poses of the candidate configurations to a known pose of the transport structure expected to be at the location based on the map;

(v) attempting to identify which of the candidate configurations is most likely to be for a known transport structure based on the comparing; and controlling the autonomous vehicle based on whether one of the candidate configurations has been identified to be for a known transport structure;

wherein comparing comprises:

assigning a confidence score to each of the candidate configurations, the confidence score being based, at least in part, on how much alike a geometry of a candidate configuration is to a geometry of the known transport structure and how closely a pose of the candidate configuration is to the known pose of the transport structure expected to be at the location; and comparing confidence scores of the candidate configurations to a threshold.

2. The method of claim 1, wherein performing the calculations comprises performing calculations for different combinations of the features based on the physical attributes of the features.

3. The method of claim 2, wherein the calculations comprise:

determining lengths for the different combinations of the features by obtaining a difference between front left and front right locations of the different combinations of the features.

4. The method of claim 1, wherein if only one of the confidence scores exceeds the threshold, then a candidate configuration having the one of the confidence scores is deemed most likely to be the known transport structure.

5. The method of claim 1, wherein the confidence score of a candidate configuration is based on an X-axis location of the candidate configuration, a Y-axis location of the candidate configuration, a pose of the candidate configuration, and a width of the candidate configuration.

6. The method of claim 5, wherein the pose of the candidate configuration is based on a location of a centroid of the candidate configuration.

7. The method of claim 1, wherein the features comprise points in a cluster, the points in the cluster having at least one of a predefined proximity to each other, a predefined continuity, or a predefined count.

8. The method of claim 1, wherein the physical attributes comprise extremities associated with the features.

9. The method of claim 8, wherein the extremities comprise a front left and a front right of each of the features.

10. The method of claim 9, wherein the calculations comprise:

determining lengths between the front left and the front right of each of the features;

determining locations of centroids for each of the lengths; and obtaining a normal through each of the locations.

11. The method of claim 1, wherein the candidate configurations comprises one or more of locations of pillars and pockets.

12. The method of claim 1, further comprising:

identifying an empty location based on the two-dimensional scan;

wherein the location where the transport structure is expected to be is next to the empty location; and wherein the autonomous vehicle is controlled to deposit a transport structure in the empty location based on a likelihood of the candidate configuration being for the known transport structure.

13. The method of claim 1, wherein, if a single confidence score is greater than or equal to the threshold, a candidate configuration having the single confidence score is identified as the known transport structure; and wherein, if all confidence scores are less than the threshold, the method comprises repeating at least operations (i), (ii), (iii), (iv), and (v).

14. The method of claim 1, wherein the known transport structure comprises a known pallet.

15. The method of claim 1, wherein the known transport structure comprises a known container.

16. One or more non-transitory machine-readable storage media storing instructions that are executable by one or more processing devices to perform operations comprising:

receiving, at a control system for an autonomous vehicle, a map of a space that is usable by a fleet of autonomous vehicles to navigate through the space, the map including poses of transport structures expected to be at locations in the space;

(i) identifying features based on data obtained from a two-dimensional scan of at least part of a location where a transport structure is expected to be;

(ii) identifying physical attributes of the features;

(iii) performing calculations based on the physical attributes of the features, where candidate configurations for the transport structure at the location are based on the calculations;

(iv) comparing (i) the candidate configurations to predefined configurations for known transport structures, and (ii) poses of the candidate configurations to a known pose of the transport structure expected to be at the location based on the map;

(v) attempting to identify which of the candidate configurations is most likely to be for a known transport structure based on the comparing; and controlling the autonomous vehicle based on whether one of the candidate configurations has been identified to be for a known transport structure;

wherein comparing comprises:

assigning a confidence score to each of the candidate configurations, the confidence score being based, at least in part, on how much alike a geometry of a candidate configuration is to a geometry of the known transport structure and how closely a pose of the candidate configuration is to the known pose of the transport structure expected to be at the location; and comparing confidence scores of the candidate configurations to a threshold.

17. The one or more non-transitory machine-readable storage media of claim 16, wherein performing the calculations comprises performing calculations for different combinations of the features based on the physical attributes for the features.

18. The one or more non-transitory machine-readable storage media of claim 17, wherein the calculations comprise:

determining lengths for the different combinations of the features by obtaining a difference between front left and front right locations of the different combinations of the features.

19. The one or more non-transitory machine-readable storage media of claim 16, wherein if only one of the confidence scores exceeds the threshold, then a candidate configuration having the one of the confidence scores is deemed most likely to be the known transport structure.

20. The one or more non-transitory machine-readable storage media of claim 16, wherein the confidence score of a candidate configuration is based on an X-axis location of the candidate configuration, a Y-axis location of the candidate configuration, a pose of the candidate configuration, and a width of the candidate configuration.

21. The one or more non-transitory machine-readable storage media of claim 20, wherein the pose of the candidate configuration is based on a location of a centroid of the candidate configuration.

22. The one or more non-transitory machine-readable storage media of claim 16, wherein the features comprise points in a cluster, the points in the cluster having at least one of a predefined proximity to each other, a predefined continuity, or a predefined count.

23. The one or more non-transitory machine-readable storage media of claim 16, wherein the physical attributes comprise extremities associated with the features.

24. The one or more non-transitory machine-readable storage media of claim 23, wherein the extremities comprise a front left and a front right of each of the features.

25. The one or more non-transitory machine-readable storage media of claim 24, wherein the calculations comprise:

determining lengths between the front left and the front right of each of the features;

determining locations of centroids for each of the lengths; and obtaining a normal through each of the locations.

26. The one or more non-transitory machine-readable storage media of claim 16, wherein the candidate configurations comprises one or more of locations of pillars and pockets.

27. The one or more non-transitory machine-readable storage media of claim 16, wherein the operations comprise:

identifying an empty location based on the two-dimensional scan;

wherein the location where the transport structure is expected to be is next to the empty location; and wherein the autonomous vehicle is controlled to deposit a transport structure in the empty location based on a likelihood of the candidate configuration being for the known transport structure.

28. The one or more non-transitory machine-readable storage media of claim 16, wherein, if a single confidence score is greater than or equal to the threshold, a candidate configuration having the single confidence score is identified as the known transport structure; and wherein, if all confidence scores are less than the threshold, the operations comprise repeating at least operations (i), (ii), (iii), (iv) and (v).

29. The one or more non-transitory machine-readable storage media of claim 16, wherein the known transport structure comprises a known pallet.

30. The one or more non-transitory machine-readable storage media of claim 16, wherein the known transport structure comprises a known container.

31. A system comprising:

an autonomous vehicle comprising a scanner to perform a two-dimensional scan of a space; and a control system comprising:

memory storing instructions that are executable; and one or more processing devices to execute the instructions to perform operations comprising:

receiving, at the control system, a map of a space that is usable by a fleet of autonomous vehicles to navigate through the space, the map including poses of transport structures expected to be at locations in the space;

(i) identifying features based on data obtained from a two-dimensional scan of at least part of a location where a transport structure is expected to be;

(ii) identifying physical attributes of the features;

(iii) performing calculations based on the physical attributes of the features, where candidate configurations for the transport structure at the location are based on the calculations;

(iv) comparing (i) the candidate configurations to predefined configurations for known transport structures, and (ii) poses of the candidate configurations to a known pose of the transport structure expected to be at the location based on the map;

(v) attempting to identify which of the candidate configurations is most likely to be for a known transport structure based on the comparing; and controlling the autonomous vehicle based on whether one of the candidate configurations has been identified to be for a known transport structure;

wherein comparing comprises:

assigning a confidence score to each of the candidate configurations, the confidence score being based, at least in part, on how much alike a geometry of a candidate configuration is to a geometry of the known transport structure and how closely a pose of the candidate configuration is to the known pose of the transport structure expected to be at the location; and comparing confidence scores of the candidate configurations to a threshold.

32. The system of claim 31, wherein the control system is part of the autonomous vehicle.

33. The system of claim 31, wherein all or part of the control system is physically remote from the autonomous vehicle.

34. The system of claim 32, wherein the known transport structure comprises a known pallet.

* * * * *